Aug. 7, 1928.  
W. H. CANNARD  
1,680,203  
CREPE AND METHOD OF AND APPARATUS FOR MAKING THE SAME  
Filed April 7, 1924   4 Sheets-Sheet 1

Inventor  
William H. Cannard  
By Emmo W. Parry  
Attorney

Aug. 7, 1928. 1,680,203
W. H. CANNARD
CREPE AND METHOD OF AND APPARATUS FOR MAKING THE SAME
Filed April 7, 1924 4 Sheets-Sheet 4

Inventor
William H. Cannard
By
Attorney

Patented Aug. 7, 1928.

1,680,203

UNITED STATES PATENT OFFICE.

WILLIAM H. CANNARD, OF GREEN BAY, WISCONSIN

CREPE AND METHOD OF AND APPARATUS FOR MAKING THE SAME.

Application filed April 7, 1924. Serial No. 704,867.

This invention relates to crepe and involves it, as a product, and also the method of and apparatus for making the same.

In commercial practice, it has been found desirable to make crepe elastic in a plurality of directions; in other words, for practical purposes, I have discovered that it is of considerable advantage to provide for elasticity in the crepe, or the like, in a plurality of directions where such crepe is used for bags, containers, liners for cartons, and the like.

To that end, the present invention has for one of its primary objects the production of crepe having double crepes or crinkles, one set thereof extending in one direction while another set extends in a predetermined relatively different relation thereto. More specifically stated, it is contemplated by the present invention to provide a crepe having, say, longitudinally-arranged crepes or crinkles of a given density or coarseness, and cross-crinkles or crepes of a predetermined and (in some instances) relatively different degree of density, so that the product may embody coarse and fine sets of crinkles disposed in crossed or angular arrangement. The double crepe, thus involved, may include crinkles or crepes at one of its portions of a relatively different degree of density from that at another of its portions.

The method of producing this product involves the creping or crinkling of a web—of paper, fabric, or other material—in one direction; then pressing these crinkles until they assume a fixed character; then forming another set of crepes or crinkles across the other set; and then making that set permanent and fixed. A subsidiary feature of this method involves the formation of crinkles in a web traveling in one direction; crowding the web at one point so that it is fed faster at one portion than it is removed at another and, while in this crowded condition and having a normal tendency to produce waves across the web, it is subjected to pressure applied (in some instances) in relatively different degrees, whereby a plurality of crinkles or crepes of almost unlimited number of qualities and character may be produced.

The apparatus utilized to practice the method mentioned includes instrumentalities not only for feeding the web but, also, for effecting the crowding of different portions thereof and with relatively different pressures and at relatively different angles, whereby there is produced in the web crinkles, crepes, or waves extending in relatively different directions and being of relatively different but predetermined densities. As a subsidiary feature of such apparatus, means are provided whereby the pressure on the corrugations or crinkles may be adjusted, and whereby the speed with which the pressure is applied thereto may be changed at will; the mechanism involved being, in its entirety, more or less automatic and operating automatically when the aforementioned instrumentalities are set and the machinery is in operation.

The method and apparatus for practicing the same contemplate action upon the web either while dry or wet.

Other objects and features characterize the method and apparatus and the resultant product, and these will in part be apparent and in part be made to appear in the description hereinafter set forth.

The contemplated apparatus is susceptible of varied embodiment; but a preferred type thereof is illustrated in the accompanying drawings; it being understood, however, that these are merely illustrative and that other embodiments and applications are within the contemplation of my inventive concept and that the illustrated embodiment is susceptible of considerable modification and variation without departing from the spirit of the invention or sacrificing any of the salient features and underlying principles thereof.

Referring to the drawings, the reference-character 1 designates side sections of a machine adapted to function for the production of a crepe product; these sections being integral or otherwise connected together and mounted on standards 1ª to constitute a frame or support for the instrumentalities hereinafter described.

At one end of the frame is a roll 2, suitably journaled in the side sections and adapted to lead a web of material, such as paper, fabric, or the like, and marked 3 (Figs. 5 to 11) from a source of supply, not shown. This web may be dry, wet, or moistened, but preferably the latter.

Preferably and as shown, means are provided for developing ridges or corrugations longitudinally of the web and in a wavy or irregular line; such means including (in the present instance) an upper blast-box 4 and a lower blast-box 5, each disposed transversely of the frame of the machine, and each provided with a line of perforations or apertures 6, those in the one box being disposed in staggered relation to those in the other.

Figure 1:
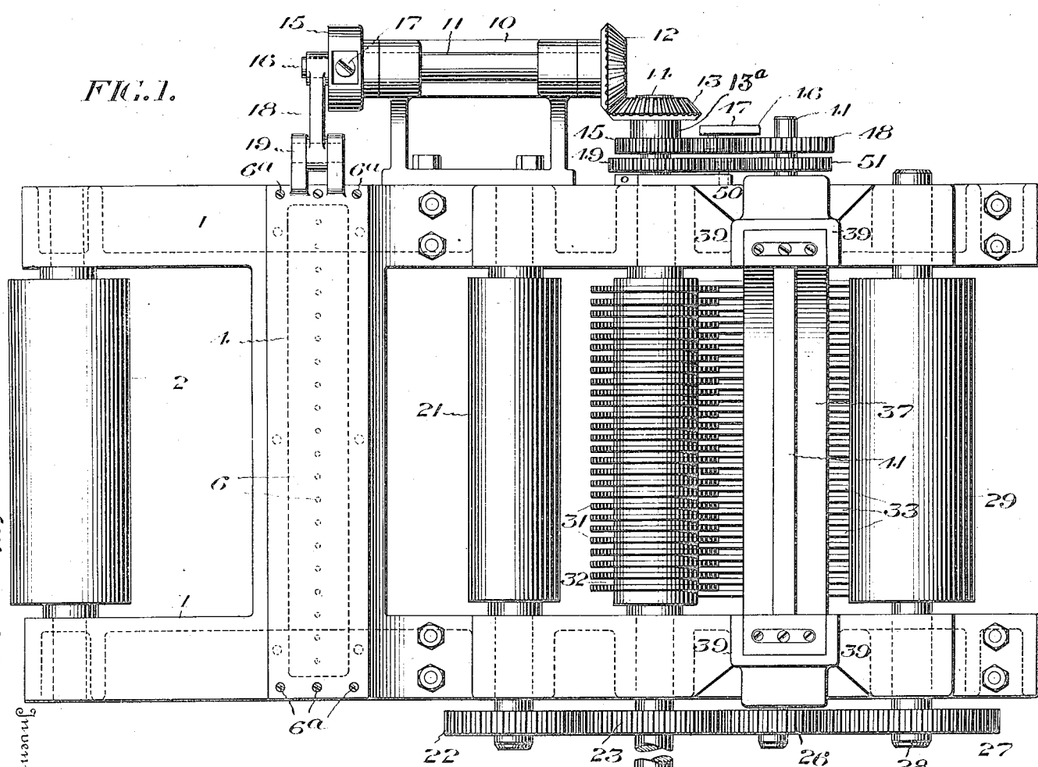
Figure 1 is a view in top plan of a machine constructed in accordance with the invention.
Figure 2:
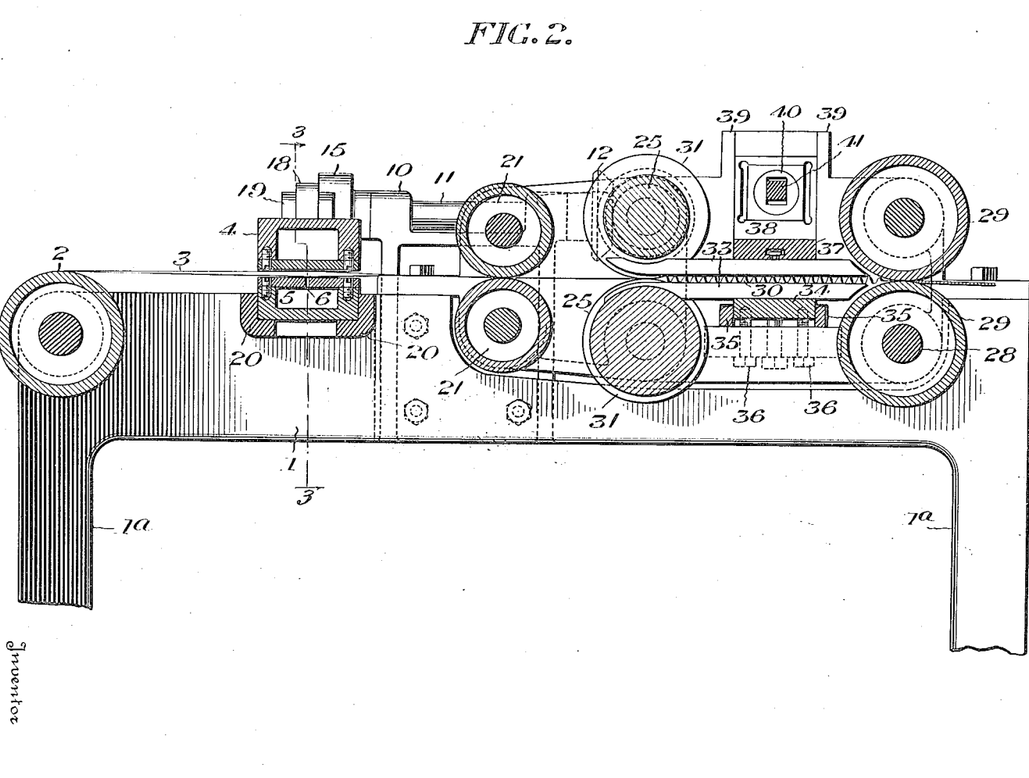
Fig. 2 is a fragmentary view in longitudinal central section.
Figure 3:
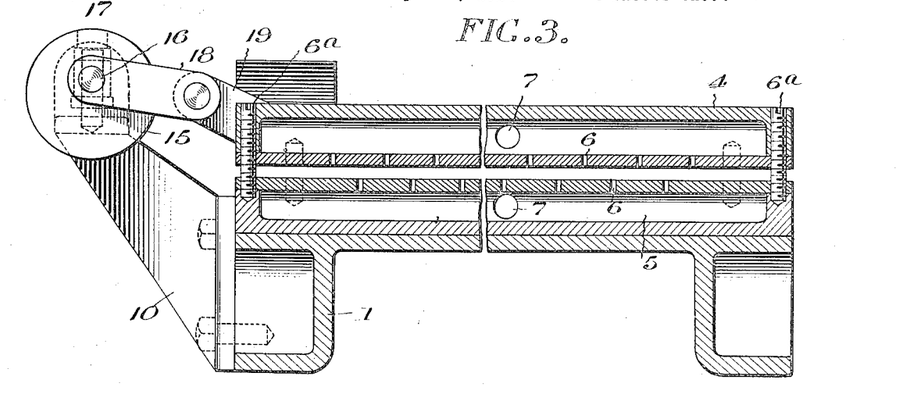
Fig. 3 is also a fragmentary view, in transverse section, on the line 3—3, Fig. 2.

As shown in Figs. 2 and 3, the upper and lower blast-boxes are connected together, as by screws 6ª, and by which they are maintained in spaced relation and whereby such relation may be varied at the will of the operator.

Each of the blast-boxes is provided with an opening or aperture 7 for the introduction of a pressure-medium—such as air under pressure—the same being fed into the box from a suitable source of supply (not shown). The web passes through the space between the two boxes and, being in a moist condition preferably, is acted upon by the pressure-medium fed through the perforations 6 in a more or less continuous manner, and whereby substantially continuous, sinuous ridges 8 (Figs. 5 and 6) are produced in the web and in the form of corrugations there being a flat portion 9 (Fig. 6) between adjacent corrugations.

Figure 5:
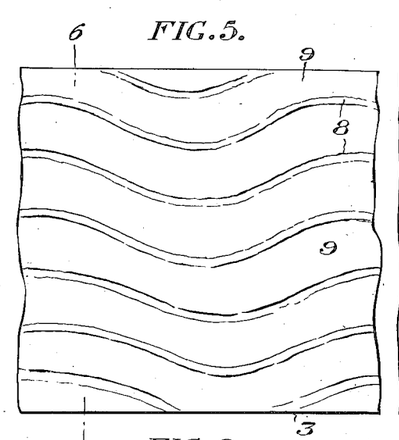
Fig. 5 is a fragmentary view, more or less diagrammatic, of a web of material and illustrating a step in the production of the product and showing the web formed with longitudinally extending grooves or ridges.

Preferably and as shown, means are provided for effecting movement of the blast-boxes transversely of the path of travel of the web, and whereby the ridges are developed in a wavy or sinuous line, as shown in Fig. 5. These means, in this instance, include a bracket 10 mounted on one of the side sections of the frame and having a shaft 11 journaled therein. On one end of the shaft is a pinion 12 which meshes with a gear 13 fast on a shaft 14 extending transversely of the frame and in driving connection with a suitable source of power (not shown) and which constitutes the main drive shaft of the machine. On the opposite end of the shaft 11 is a disk 15, in the form of an eccentric and to which a crank 16 is slidably connected. By means of a set screw 17, the crank may be adjusted toward or away from the center of the disk. A pitman 18 connects the crank with lugs or projections 19 outstanding from the box 4. As the blast-boxes are slidably sustained by the machine-frame and as both are connected together, in the manner already specified, it will be understood that, through the instrumentalities described, rotation of the shaft 11 produces a reciprocatory movement of the blast-boxes in relation to the longitudinal travel of the web between the boxes. To facilitate such movement, the lower blast-box is provided with slideways 20 (Fig. 2). By reason of the fact that the respective perforations in the boxes 4 and 5 are staggered relatively and are, thus, out of register one with the other, the blast, due to the pressure-medium from the lower box would bulge the web upwardly to form ridges or corrugations upstanding from the face of the web, while the blast from the upper box, due to the pressure-medium forced therefrom, will cause ridges or corrugations to be formed in the web and which extend downwardly from the face thereof.

From this mechanism which has formed the longitudinal grooves or corrugations in the web, the latter is led to means for compressing the ridges or corrugations; such means comprising (in this instance) a pair of press-rolls 21 journaled in the side sections and, preferably and as shown, geared together, as by gears 22, and which are in mesh with a driving pinion 23 fast on the main drive shaft 14. The action of the press-rolls 21 is such that, as the web passes therebetween, the corrugations or ridges in the web are compressed and ironed or flattened into the form shown at 24 in Fig. 8.

Preferably and as shown, means are also provided for developing crinkles or crepes in the web in a direction predetermined but relatively different from the aforementioned longitudinal crinkles or crepes; and, in this instance, these means comprise a pair of juxtaposed rollers 25 extending transversely of the machine and geared together so as to rotate in opposite directions and to draw the web between them, one of the gears 22 thereof being in mesh with an idler 26 and which, in turn, is in mesh with a gear 27 fast on a roll-carrying shaft 28 on which is mounted one of a pair of press-rolls 29. These rolls are likewise geared together for rotation in the same direction. It will be understood that, as the driving pinion 23 is keyed to the main drive shaft 14, and as the rolls 21, 25 and 29 are in driving connection therewith, all of said rolls receive motion therefrom. The timing of the gears is such that the rolls 25 rotate at a greater speed than that of the rolls 29 and this results in a somewhat crowding of the paper forward and whereby cross-corrugations or ridges 30 (Figs. 2 and 9) are formed.

Figure 4:
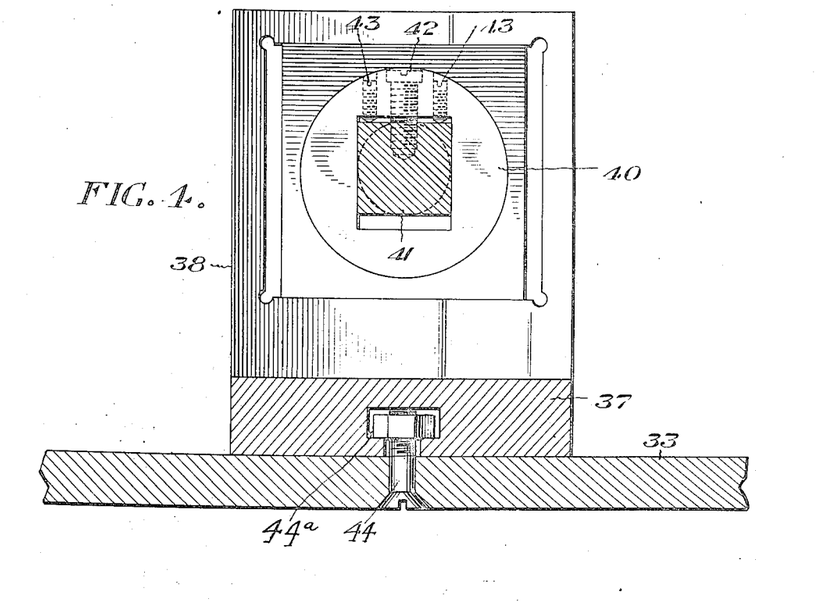
Fig. 4 is a view in sectional elevation of a portion of the structure.

Preferably and as shown, means are provided for predetermining the extent of these cross-corrugations and whereby their height may be varied at the will of the operator; such means being adjustable to permit the desired variation. These means, in this instance, involve the provision of a series of disks 31 mounted on the rolls 25 and separated by suitable spacer elements 32. Extending into the slots or spaces formed between the disks 31 are a plurality of confining and pressing members 33, the respective sets thereof, for the upper and lower rolls 25, being spaced apart, as shown in Fig. 2. The forward end of each of these members is slightly curved, and acts as a stripper and also serves to prevent the web from sticking to the rolls 25. The lower set of the members 33 is mounted on a cross-bar 34, supported in guides 35, and vertically adjustable by means of adjusting screws 36. The upper set of the members 33 is mounted for reciprocatory movement with respect to the lower set, and the means for effecting such movement comprises, in this instance, a cross-bar 37 upon which the members are adjustably mounted and which is secured at its ends to blocks 38 slidably mounted in slideways 39 disposed at each side of the machine. These blocks are reciprocated by eccentric 40 on a shaft 41 which is squared and passes through openings 40ª in the eccentrics, the walls of the openings being adapted to engage the shaft. A set-screw 42 in each block predetermines the position of the respective eccentrics with relation to the shaft; and an adjustment thereof, when made, is maintained by jam-screws 43. By such means, the sweep of the eccentric may be definitely regulated; and, in this way, the position of the pressing-members 33 with relation to the medial line of travel of the web may also be predetermined at the will of the operator. The provision of independent means for adjusting both sets of presser-members provides for an exceedingly fine degree of crinkling. Besides, the individual presser-members are so mounted as to permit of their longitudinal adjustment on the respective supporting bars; such adjustment being effected by bolts 44 disposed in a slot 44ª (Fig. 4) in the supporting bars. It is obvious that the association of the two sets of members 33 with the other instrumentalities of the machine may be reversed—that is—the lower set be automatically movable and the upper set manually adjustable or if desired both sets may be automatically movable to vary the space therebetween by duplicating the eccentric mounting of the upper members, as shown, for the mounting disclosed for the lower members. It will be observed that the oscillatory movement of one or both sets of the confining members reduces friction between the members and the web and prevents tearing of the paper in its passage therebetween. As shown, the confining members of the upper set are in vertical alinement with corresponding members of the lower set but it is to be understood that the members of one set may be staggered with respect to the members of the other set.

Preferably and as shown, means are provided for changing the speed of actuation of the aforementioned eccentrics and blast-boxes; and, in this instance, the gear 13 is mounted on a collar 13ª which is loosely supported on the shaft 14. The collar carries a gear 45 in mesh with an idler 46 detachably disposed on a supporting member 47. The idler is driven from a gear 48 fast on the driving-shaft 41. This shaft 41 is driven through a pinion 49 fast on the main driveshaft 14. Meshing with the pinion 49 is an idler 50 detachably supported so that different ratio gears may be substituted. The idler is in mesh with the gear 51 keyed to the eccentric shaft 41. By this means is provided an easy manner of changing the speed at which both the eccentric and the blast-boxes are reciprocated and whereby crinkles or crepe are positively developed in the web, the degree of coarseness or fineness of which, to a nicety, may be varied at the will of the operator.

The initial action in the production of the cross-crinkle in the web is indicated in Fig. 2, and wherein the eccentric is at the limit of its sweep in one direction. Rotation of the shaft 41 will move the upper set of presser-members against the corrugations and flatten them down into the position indicated at 52, Fig. 10.

From the foregoing, it will be perceived that the method which characterizes my invention involves the production, at one stage of the operation, of longitudinal corrugations or crinkles in the web; then, the setting of these by pressure; then the crowding of the web in the direction of its travel to produce cross-corrugations or crinkles that extend approximately transversely of the web; then giving these cross-crinkles a partial crushing action to produce irregular crinklings or crepes; and then subjecting these resultant crinkles or crepes to a setting action to cause them to become a permanent part of the web and of somewhat more irregular arrangement. In this connection, it may be stated that the rolls 29, in addition to crowding the web and producing the cross-corrugations also function to press the crinkles permanently into the web.

Figures 6, 8, 9, 10, 11:
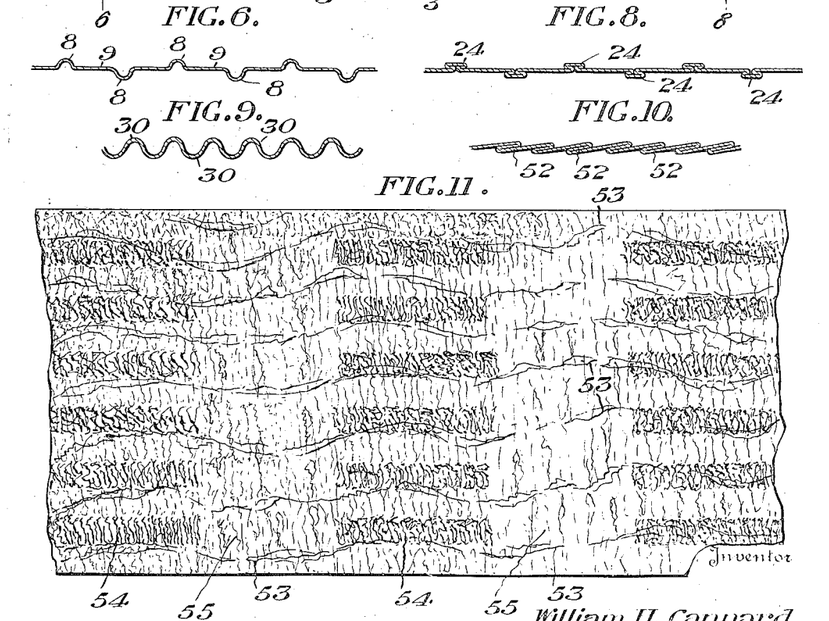
Fig. 6 is a similar view, in transverse section, on the line 6—6 of Fig. 5.
Fig. 8 is a view similar to Fig. 6, on the line 8—8 of Fig. 7.
Fig. 9 is a fragmentary view, in longitudinal section, showing a portion of the web in the condition it assumes during one step in the making of the product.
Fig. 10 is a similar view after the ridges produced by the step illustrated in Fig. 9 have been subjected to pressure.
Fig. 11 is a fragmentary view, in plan, showing the product resulting from the several steps involved in the method and illustrating, somewhat diagrammatically, the relative arrangement of the crinkles or crepes in the finished product.
Figure 7:
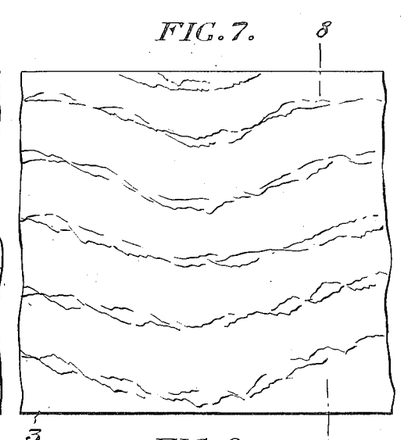
Fig. 7 is a view similar to Fig. 5 and showing a second step in the method, this involving the ridges produced by the first step after the same have been subjected to pressure.

The resultant product, more or less diagrammatically illustrated in Fig. 11, comprises a crepe having crinkles of a predetermined degree of coarseness or fineness (as the case may be) and indicated at 53, and which extend longitudinally of the web; also cross-crinkles, indicated at 54 in Fig. 11, and likewise of a predetermined degree of coarseness or fineness (as the case may be) and extending transversely of the web; and, also, portions, indicated at 55, more or less spaced and uncreped; this leaving the disposition of the cross-crinkles intermittent and resulting from the reciprocation of the presser-elements 33, as already described, while the web is traveling through the machine.

It is to be understood that, by reason of the unique relationship of the instrumentalities embodied in the machine, their action on the web as the same passes therethrough, and the means for varying the action of the instrumentalities, I am enabled to produce a novel type of crepe which is characterized by advantages in the practical use of the same.

What I claim is:

1. The hereindescribed method of producing crepe which includes the steps of moving a web lengthwise and, while in motion, forming corrugations therein in one direction, subjecting the corrugations to pressure to produce crinkles in the web, producing corrugations in the web which extend in a direction relatively different from that of the first-mentioned corrugations, and subjecting such corrugations to pressure to produce crinkles in the web.

2. The method of producing crepe which includes the steps of moving a web lengthwise and, while in motion, forming corrugations therein, pressing these corrugations into crinkles, crowding the crinkled portions to produce corrugations extending in a direction relatively different from those first formed, and subjecting the second-formed corrugations to pressure to form crinkles thereof.

3. A machine for producing crepe including means for feeding a web of material lengthwise, mechanism for producing crinkles longitudinally of the path of travel of the web and operatively associated with the feeding means to function simultaneously therewith, mechanism for producing a second set of crinkles in the web in a direction relatively different from the longitudinal crinkles, and means operatively associated with one of the crinkle-producing mechanisms for varying the degree of density of the crinkles.

4. A machine for producing crepe including means for feeding a web of material, mechanism for producing crinkles in the web longitudinally of its path of travel, mechanism for producing a second set of crinkles in the web in a direction relatively different from the longitudinal crinkles, and means for varying the speed of action of one of the crinkle-producing mechanisms.

5. A machine for producing crepe including means for feeding a web of material, mechanism for producing crinkles in the web longitudinally of its path of travel, mechanism for producing a second set of crinkles in the web in a direction relatively different from the longitudinal crinkles, and means for varying the action of one of the crinkle-producing mechanisms.

6. A machine for producing crepe including web-feeding mechanism, an instrumentality operatively associated therewith for producing ridges in a web fed through the machine, a pressure instrumentality for pressing the ridges into the web, mechanism for producing crinkles in predetermined relation to the ridges, and means for varying the degree of coarseness of certain of the crinkles with relation to other of the crinkles.

7. A machine for producing crepe including web-feeding mechanism, an instrumentality operatively associated therewith for producing ridges in a web fed through the machine, a pressure instrumentality for pressing the ridges into the web, mechanism for producing crinkles in predetermined relation to the ridges, means for varying the degree of coarseness of certain of the crinkles with relation to other of the crinkles, and means for changing the speed with which one of the crinkle-producing mechanisms operates.

8. A machine for forming crepe including feed mechanism for the web, pressure devices disposed on opposite sides of the line of travel of the web, said devices having discharge openings so arranged that pressure medium forced through the openings will produce oppositely disposed ridges on the web.

9. A machine for forming crepe, comprising a feed mechanism for a web, a pressure device provided with a discharge opening disposed in the path of travel of the web, and a pressure device provided with an opening for the discharge of a pressure medium disposed opposite to the first pressure device, the path of travel of the web being between the devices, an opening in one of the devices being in staggered relation to an opening in the other device, whereby pressure medium forced through the openings will produce oppositely-disposed ridges on the web.

10. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices, and mechanism for moving one of the pressure devices transversely of the web.

11. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce ridges in the web, and mechanism for pressing the ridges to form crinkles in the web.

12. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce ridges in the web, and mechanism for pressing the ridges to form crinkles in the web, said mechanism including a pair of pressure rollers operatively associated with certain of the other instrumentalities.

13. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, and mechanism for producing crinkles in a different direction from the first-mentioned crinkles, operatively associated with certain of the other instrumentalities.

14. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, and mechanism for crowding the web between the confining members to produce folds in the web, operatively associated with certain of the other instrumentalities.

15. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, and mechanism for crowding the web between the confining members to produce folds in the web operatively associated with certain of the other instrumentalities, said mechanism including a plurality of feeding instrumentalities, one of which is arranged to operate at a speed different from the other.

16. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, mechanism for crowding the web between the confining members to produce folds in the web operatively associated with certain of the other instrumentalities, and means for subjecting the folds to pressure, while confined, operatively associated with certain of the other instrumentalities.

17. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, mechanism for crowding the web between the confining members to produce folds in the web operatively associated with certain of the other instrumentalities, means for subjecting the folds to pressure, while confined, operatively associated with certain of the other instrumentalities, said means comprising a plurality of pressure members disposed on opposite sides of the web, and means for intermittently moving certain of the pressure members toward and away from the others to intermittently crush the folds formed in the web.

18. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, mechanism for crowding the web between the confining members to produce folds in the web operatively associated with certain of the other instrumentalities, means for subjecting the folds to pressure, while confined, operatively associated with certain of the other instrumentalities, said means comprising a plurality of pressure members disposed on opposite sides of the web, means for intermittently moving certain of the pressure members toward and away from the others to intermittently crush the folds formed in the web, and means associated therewith for effecting an adjustment of certain of the members with relation to others.

19. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, mechanism for crowding the web between the confining members to produce folds in the web operatively associated with certain of the other instrumentalities, means for subjecting the folds to pressure while confined operatively associated with certain of the other instrumentalities, said means comprising a plurality of pressure members disposed on opposite sides of the web, means for intermittently moving certain of the pressure members toward and away from the others to intermittently crush the folds formed in the web, means associated therewith for effecting an adjustment of certain of the members with relation to others, said pressure means including a support for the pressure members, an eccentric operatively associated with the support, and mechanism for operating the eccentric operatively associated with certain of the other instrumentalities.

20. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, mechanism for crowding the web between the confining members to produce folds in the web operatively associated with certain of the other instrumentalities, means for subjecting the folds to pressure, while confined, operatively associated with certain of the other instrumentalities, said means comprising a plurality of pressure members disposed on opposite sides of the web, means for intermittently moving certain of the pressure members toward and away from the others to intermittently crush the folds formed in the web, means associated therewith for effecting an adjustment of certain of the members with relation to others, said pressure means including a support for the pressure members, an eccentric operatively associated with the support, mechanism for operating the eccentric operatively associated with certain of the other instrumentalities, and means for varying the degree of pressure exerted between the members.

21. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, mechanism for crowding the web between the confining members to produce folds in the web operatively associated with certain of the other instrumentalities, means for subjecting the folds to pressure while confined operatively associated with certain of the other instrumentalities, said means comprising a plurality of pressure members disposed on opposite sides of the web, means for intermittently moving certain of the pressure members toward and away from the others to intermittently crush the folds formed in the web, means associated therewith for effecting an adjustment of certain of the members with relation to others, said pressure means including a support for the pressure members, an eccentric operatively associated with the support, mechanism for operating the eccentric operatively associated with certain of the other instrumentalities, and mechanism for varying the speed with which the intermittent pressure is exerted operatively associated with certain of the other instrumentalities.

22. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, mechanism for crowding the web between the confining members to produce folds in the web operatively associated with certain of the other instrumentalities, means for subjecting the folds to pressure, while confined, operatively associated with certain of the other instrumentalities, and means for pressing the crushed portions of the web into permanent crinkles therein.

23. A machine for forming crepe, comprising a feed mechanism for a web, a pressure device provided with a discharge opening disposed in the path of travel of the web, a pressure device provided with an opening for the discharge of a pressure medium disposed opposite to the first pressure device, the path of travel of the web being between the devices to produce longitudinal ridges in the web, means for pressing the ridges to produce crinkles therein, mechanism for producing crinkles in a different direction from the first-mentioned crinkles operatively associated with certain of the other instrumentalities, said mechanism including confining members between which the web is passed, mechanism for crowding the web between the confining members to produce folds in the web operatively associated with certain of the other instrumentalities, means for subjecting the folds to pressure, while confined, operatively associated with certain of the other instrumentalities, and means for pressing the crushed portions of the web into permanent crinkles therein, said means including press-rolls in operable connection with certain of the other instrumentalities.

24. In a machine for forming crepe, web-feeding mechanism, and a pressure device disposed on opposite sides of the web and including nozzles for directing a pressure medium against the web to form ridges therein.

25. In a machine for forming crepe, web-feeding mechanism, and a pressure device disposed on opposite sides of the web and including nozzles for directing a pressure medium against the web to form ridges therein, the nozzle in one portion of the pressure device being in staggered relation to a nozzle in another portion of the device.

26. A machine for making crepe, comprising a web-feeding instrumentality, a pressure device provided with an opening for the discharge of a pressure medium disposed on one side of the web, and a pressure device provided with an opening for the discharge of a pressure medium disposed on the opposite side of the web, the opening on one device being in staggered relation to the opening in the other device whereby pressure medium passing through the openings will produce oppositely disposed ridges on the web.

27. As an article of manufacture, a crepe having longitudinally curved crinkles extending in one direction and compressed pleats extending in a predetermined relatively different direction.

28. In a machine for making crepe, mechanism for feeding a web of material, and means for applying fluid pressure to the web to produce oppositely disposed ridges in the web while being fed.

29. In a machine for making crepe, mechanism for feeding a web of material, means for applying fluid pressure to the web to produce oppositely disposed ridges in the web while being fed, and means for pressing the ridges to form crinkles.

30. The herein described method of producing crepe which includes the steps of moving a web lengthwise and, while in motion, crowding portions of the web to produce corrugations therein, and subjecting the corrugations to pressure to press them into the web to form flattened crinkles thereof.

31. The herein described method of producing crepe which includes the steps of moving a web lengthwise and, while in motion, crowding portions of the web by effecting movement of portions of the web at relatively different speeds to produce corrugations therein, and subjecting the corrugations to pressure to press them into the web to form flattened crinkles thereof.

32. A machine for forming crepe, including a plurality of web feeding mechanisms, upper and lower web confining means disposed intermediate the feeding mechanisms, means for driving the feeding mechanisms at relatively different speeds, and means for automatically varying the relative positions of the upper and lower web confining means as the web passes therebetween.

33. A machine for forming crepe, including a plurality of web feeding mechanisms, web confining means disposed intermediate the feeding mechanisms, means for driving the web feeding mechanisms at relatively different speeds for crowding the web between portions of the web confining means to produce folds in the web, and means for automatically varying the relative positions of said portions of the web confining means to vary the size of the folds formed in the web as it passes through the machine.

34. A machine for forming crepe, including a plurality of web feeding mechanisms, web confining means disposed intermediate the feeding mechanisms, means for driving the web feeding mechanisms at relatively different speeds to cause a corrugating of the web, and means whereby the web confining mechanism is operative to vary the size of corrugations formed in the web.

35. A machine for forming crepe, including a plurality of web feeding mechanisms, web confining means disposed intermediate the feeding mechanisms, means for driving the web feeding mechanisms at relatively different speeds to cause a corrugating of the web, and means whereby the web confining mechanism is operative to vary the size of corrugations formed in the web and also to intermittently compress the corrugations.

36. A machine for forming crepe including a web feeding mechanism, a web feeding and compressing mechanism, means for driving said mechanisms at relatively different speeds, web confining means interposed between said mechanisms for causing the formation of folds in the web, and means associated with the web confining means for causing the latter to automatically vary the size of said folds.

37. A machine for forming crepe including a web feeding mechanism, a web feeding and compressing mechanism, means for driving said mechanisms at relatively different speeds, web confining means interposed between said mechanisms for causing the formation of folds in the web, and means associated with the web confining means for causing the latter to automatically vary the size of said folds and to intermittently compress them.

38. A machine for forming crepe including a plurality of web feeding mechanisms, means for driving said mechanisms at relatively different speeds, web confining means disposed between said mechanisms above and below the path of travel of the web, and means for causing an oscillatory movement of a portion of the web confining means.

In testimony whereof I affix my signature.

WILLIAM H. CANNARD.